United States Patent [19]

Bucklitzsch

[11] 4,060,872

[45] Dec. 6, 1977

[54] WINDSHIELD WIPER AND WASHER

[76] Inventor: Hans H. Bucklitzsch, Rte. 2, Bloomington, Ill. 61701

[21] Appl. No.: 655,521

[22] Filed: Feb. 5, 1976

[51] Int. Cl.² .............................................. B60S 1/46
[52] U.S. Cl. ................................. 15/250.04; 15/250.41
[58] Field of Search ....................... 15/250.01–250.09, 15/250.36–250.42

[56] References Cited

U.S. PATENT DOCUMENTS

| | | | |
|---|---|---|---|
| 1,970,497 | 8/1934 | Gregorio | 15/250.41 X |
| 2,013,200 | 9/1935 | Conway | 15/250.41 |
| 2,582,717 | 1/1952 | Pierce | 15/250.04 |
| 2,648,865 | 8/1953 | Gordon et al. | 15/250.04 |
| 2,925,617 | 2/1960 | Williams | 15/250.41 X |
| 3,939,524 | 2/1976 | Knights | 15/250.41 X |

FOREIGN PATENT DOCUMENTS 427,534  6/1967  Switzerland ..................... 15/250.04

*Primary Examiner*—Peter Feldman
*Attorney, Agent, or Firm*—Marden S. Gordon

[57] ABSTRACT

A windshield wiper is provided with at least one wiper blade having angularly disposed channels therein and with a hollow tube having openings communicating with these channels, the tube extending longitudinally along the wiper. Hollow feed tubing connected with the tube receives washer solvent under pressure. The solvent flows out of the channels in the blade onto the windshield to enable the wiper to perform washing and wiping actions simultaneously.

2 Claims, 5 Drawing Figures

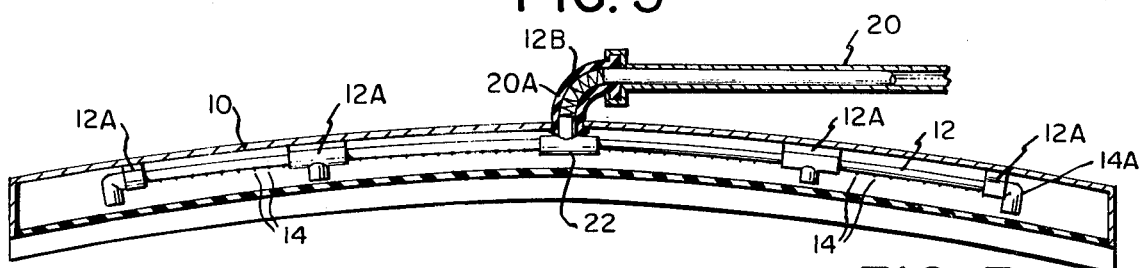
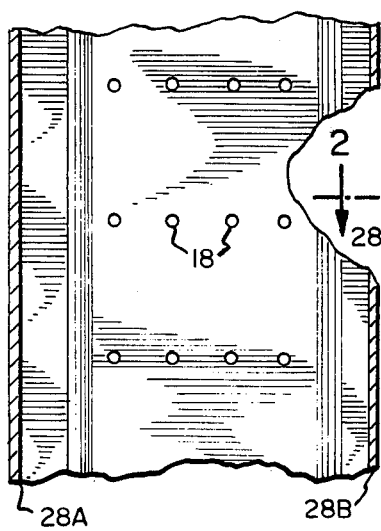
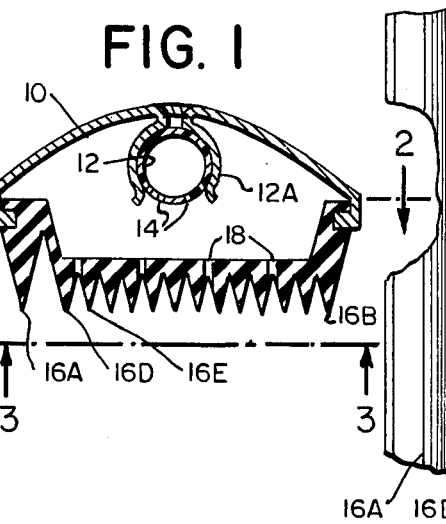
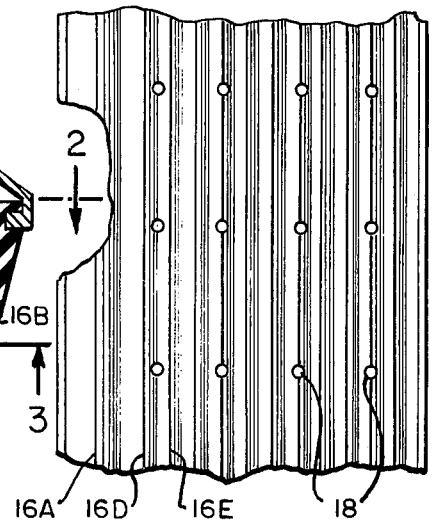
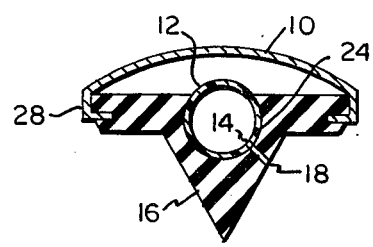

WINDSHIELD WIPER AND WASHER

BACKGROUND OF THE INVENTION

Conventional windshield wiper and washer assemblies direct a single stream of washer solvent from a single nozzle fixed in position on the wiper onto the windshield while the wiper is in movement. This requires a continual wiping and rewiping action with a single stream of solvent ineffectually hitting one spot on the windshield. Occasionally a strong wind can blow the solvent away before such wiping action operation is completed. The operation demands the utmost attention of the driver of the vehicle since his vision is blurred constantaly. In addition, the wiper smears produced on the windshield increase further the hazards of driving.

SUMMARY OF THE INVENTION

In accordance with the principles of this invention, an arrangement of one or more wiper blades have angularly disposed channels therin. A hollow tube disposed longitudinally along the rear of the blade arrangement has orifices communicating with the channels. Washer solvent under pressure is supplied to the tube and passes through the orifices and the channels onto the windshield. The solvent feed action causes the solvent to be released at a series of points along the blade arrangement regardless of the position of the blades. The washing and wiping actions become a combined operation whereby only one or two motions of the blade arrangement can produce a clean windshield. Thus the driving hazards are reduced. Moreover, since the washing and wiping action is completed in much less time than previously required, efficiency is increased and less solvent is used.

This invention can be employed in the form of an integral installation on new vehicles. A conversion kit can be used to enable installation in older vehicles.

BRIEF DESCRIPTION OF THE DRAWINGS

FIG. 1 is a vertical cross section of one form of the invention.

FIG. 2 is an enlarged view taken along line 2—2 in FIG. 1.

FIG. 3 is an enlarged view taken along line 3—3 in FIG. 1.

FIG. 4 is a vertical cross section of still another form of the invention.

FIG. 5 is a top horizontal view of the invention illustrating the solvent feed system.

DETAILED DESCRIPTION OF PREFERRED EMBODIMENTS

Referring first to FIG. 5, there is shown a wiper blade arrangement having a metal back 10 with an elongated hollow feed tube 12 secured to the rear portion of the arrangement and extending longitudinally therealong. The linkage 20 which moves the arrangement 10 back and forth along the windshield is hollow, and the hollow interior of the linkage is connected to the hollow interior of tube 12 via a connector 22 at the midpoint of the tube. The tube 12 has openings 14 through which solvent will flow under pressure when the operation of a vehicle presses a button to actuate a water solvent pump and pump solvent out of a reservoir in conventional manner. Openings 14 can contain spray heads 14A. Flexible element 12B enables the tube to fit properly in the connector and hinge member 20A enables the fit of the arm to be adjusted in accordance with the curvature of the windshield.

In the form of the invention shown in FIG. 4, a single wiper blade 16 has a plurality of angularly disposed channels 18 extending from a longitudinal groove 24 in the back of the wiper to a front surface of the wiper. The tube 12 is disposed in the groove with openings 14 aligned with adjacent ends of the channels. A clip 28 can snap engage the body of the wiper enabling the body to be slipped in and out for easement of replacement and also preventing the tube from being accidentally removed from the groove. A clamp 12A holds the tube to back 10. Consequently, the solvent is thus discharged along a front surface of the wiper blade.

Referring now to FIGS. 1–3, the wiper blade arrangement includes end blades 16A and 16B which are spaced apart by a plurality of smaller parallel blade elements 16D, 16E and the like. These blades and elements form an integral structure. Channels 18 extend transversely outward between the blade elements whereby the released solvent flows between adjacent blade elements onto the windshield. These elements can if desired take the form of brush bristles and the action will be the same. The bristles can be soft or hard and can be disposed in straight rows or in an angle to the windshield. When such angular positioning is employed, an overlapping cleaning action can be obtained.

In the arrangement of FIGS. 1–3, a one section clip 28A and 28B forms a central region for receiving and holding the tube 12 as well as having end regions engaging the rear surface of the wiper blade structure. The solvent discharged from the tube flows downwardly to the rear structure of the blade structure and then passes through the channels onto the windshield as described.

In all applications, the spray should reach the upper part of the wiper at all times in order to eliminate dry and smeared regions.

While the invention has been described with particular reference to the embodiments shown in the drawings, the invention is to be limited only by the terms of the claims which follow.

I claim:

1. A windshield wiper and washer device comprising, in combination:
   a rigid longitudinally elongated back member having a generally U-shaped transverse cross-section defining a leading edge, a trailing edge, and opposed opposite end wall members;
   a flexible longitudinally elongated wiper blade having a substantially flat top surface, a sloping front surface, a sloping back surface, and a pair of opposed end surfaces;
   the wiper blade removably affixed to the back member between the leading and trailing edges thereof and extending completely between the opposite end wall members thereof so as to define therewith a confined passageway between the back member and the top surface of the wiper blade;
   a plurality of spaced apart channels each extending completely through the wiper blade from the top surface thereof to the outer front surface thereof;
   said channels each having a front discharge opening formed along the blade front surface at each channel outer end;
   a hollow solvent feed tube disposed in the confined passageway along the back member and extending longitudinally therealong centrally thereof and terminating adjacent and inwardly from the back member opposite end wall members;

a series of spaced apart openings disposed in the feed tube in the direction of the blade member top surface for dispensing solvent from the tube to the channels in the blade member;

a plurality of bracket members secured to the back member extending outwardly therefrom into the passageway, the bracket members being disposed along the axis of the back member in alignment with each other, the bracket members securing the feed tube to the back member;

a generally T-shaped connector means disposed substantially centrally of the hollow feed tube and in fluid communication therewith, the arms of the T being connected to the feed tube with the body of the T projecting outwardly of the back member in a direction opposite from the position of the blade member;

a flexible hinge defining element of a hollow tubular construction having one end affixed to the projecting portion of the T-shaped connector means for delivering solvent thereto;

a hollow tubular shaped linkage arm member having one end affixed to the free end of the flexible hinge element for the purpose of moving the back member and wiper blade back and forth across a windshield, the linkage being hollow and in fluid communication with the flexible hinge to pass solvent under pressure therethrough;

a plurality of spray heads associated with some of the openings of the feed tube;

the wiper blade comprising two end blades and a plurality of smaller blade elements disposed therebetween and extending longitudinally parallel thereto; and whereby solvent can be supplied through the linkage arm member, through the hinge member, through the connector, through the feed tube, through the channels, and out of the channels front discharge openings onto the windshield to form an even coating of dispensed solvent in the path of the wiper blade for cleaning the windshield.

2. The windshield wiper and washer device as set forth in claim 1 further characterized by the outer ends of the channels being disposed between the smaller blade elements.

* * * * *